United States Patent
Kerber et al.

(10) Patent No.: US 11,784,571 B2
(45) Date of Patent: Oct. 10, 2023

(54) ELECTRICAL NETWORK WITH FLYBACK ENERGY HARVESTING DEVICE

(71) Applicant: Naval Information Warfare Center Pacific, San Diego, CA (US)

(72) Inventors: Maxwell Mayekawa Kerber, San Diego, CA (US); Lewis Hsu, Honolulu, HI (US); Joseph F. Schnecker, Jr., San Diego, CA (US); Alex G. Phipps, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 179 days.

(21) Appl. No.: 17/388,135

(22) Filed: Jul. 29, 2021

(65) Prior Publication Data
US 2023/0052264 A1 Feb. 16, 2023

(51) Int. Cl.
*H02M 3/335* (2006.01)
(52) U.S. Cl.
CPC .............. *H02M 3/33515* (2013.01)
(58) Field of Classification Search
CPC .......... H02M 3/33507; H02M 1/584; H02M 1/4225; H02M 1/007; H02M 3/33515
See application file for complete search history.

(56) References Cited

U.S. PATENT DOCUMENTS

| | | | | |
|---|---|---|---|---|
| 7,944,193 B2* | 5/2011 | Wu | ........................ | H02M 3/157 323/283 |
| 2008/0137379 A1* | 6/2008 | Mao | .................. | H02M 3/33592 363/21.06 |
| 2010/0195355 A1* | 8/2010 | Zheng | ............... | H02M 3/33507 363/21.12 |
| 2011/0241625 A1* | 10/2011 | LoCascio | .................. | H02J 7/00 320/140 |
| 2013/0294111 A1* | 11/2013 | Persson | ............. | H02M 3/33507 363/16 |
| 2017/0005582 A1* | 1/2017 | Takegami | ......... | H02M 3/33546 |
| 2017/0047846 A1* | 2/2017 | Teo | .................... | H02M 3/33507 |
| 2017/0302157 A1* | 10/2017 | Lin | .................... | H02M 3/33523 |
| 2019/0265080 A1* | 8/2019 | Awatsu | ............... | H02M 3/1563 |

* cited by examiner

*Primary Examiner* — Alex Torres-Rivera
(74) *Attorney, Agent, or Firm* — Naval Information Warfare Center, Pacific; Kyle Eppele; Matthew D. Pangallo

(57) ABSTRACT

An electrical network including a power source, a flyback converter, a microcontroller, a PID controller, a voltage boost converter, a pulse width modulator integrated circuit, and a battery. The power source produces a charge with a voltage ranging from about 0.1V to about 0.8V and a power ranging from about 0.3 mW to about 100 mW. The flyback converter functions in discontinuous current mode. The microcontroller monitors the power source voltage, calculates a voltage response, and outputs a control signal for the voltage. The PID controller is a digital PID controller, an analog PID controller, or a combination thereof. The voltage boost converter utilizes the power source voltage and power to provide higher voltage power to the electrical network. The pulse width modulator integrated circuit sets a duty cycle and frequency for the flyback converter. The battery stores excess charge produced by the power source.

18 Claims, 10 Drawing Sheets

ELECTRICAL NETWORK WITH FLYBACK ENERGY HARVESTING DEVICE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

Energy harvesting is used to capture, store, and, in some instances, power small devices or prolong battery life by collecting unused energy from environmental sources. For example, energy can be harvested from ambient vibrations, wind, heat, or solar energy. Another example is harvesting energy from microorganisms using microbial fuel cells. Microbial fuel cells are devices that convert chemical energy to electrical energy using microorganisms. Some single microbial fuel cell devices can provide a power output with voltage of up to 0.8V. Microbial fuel cells' ability to utilize renewable, persistent fuel sources increases the reliability and sustainability of connected devices or sensors capable of utilizing power generated by these devices to monitor the environment. Microbial fuel cells have been used for power generation, biosensors, and wastewater treatment.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Currently, flyback energy harvesting from a power source harvest and store energy in a battery. The battery then provides the power supply to the logic supply using a buck converter. However, these types of designs do not harvest as much energy since the logic supply is not directly powered. In other designs, flyback energy harvesting cells have fixed pulse width modulator frequencies and duty cycles. Therefore, the circuit boards turn on and off when the flyback energy harvesting cell voltage is above and below set points, respectively. As a result, these flyback energy harvesting cells lack efficiency because of operation at non-optimal power points.

In contrast, the electrical network herein includes a flyback energy harvesting device with multiple improvements. In the electrical network herein, the logic supply is powered directly by the energy harvested by the power source. The excess energy produced by the power source is then diverted to the battery. This maximizes the amount of energy harvested by the electrical network. In addition, the electrical network herein can adjust the pulse width modulator frequencies and duty cycles. This allows the power source to operate at an optimum power point, thereby maximizing the efficiency of the electrical network.

The electrical network includes a power source, a flyback converter, a microcontroller, a PID controller, a voltage boost converter, a pulse width modulator integrated circuit, and a battery. The power source produces a charge with a voltage ranging from about 0.1V to about 0.8V and a power ranging from about 0.3 mW to about 100 mW. The flyback converter functions in discontinuous current mode. The microcontroller monitors the power source voltage, calculates a voltage response, and outputs a control signal for the voltage. The PID controller is a digital PID controller, an analog PID controller, or a combination thereof. The voltage boost converter utilizes the power source voltage and power to provide higher voltage power to the electrical network. The pulse width modulator integrated circuit sets a duty cycle and frequency for the flyback converter. The battery stores excess charge produced by the power source.

Figure 1:
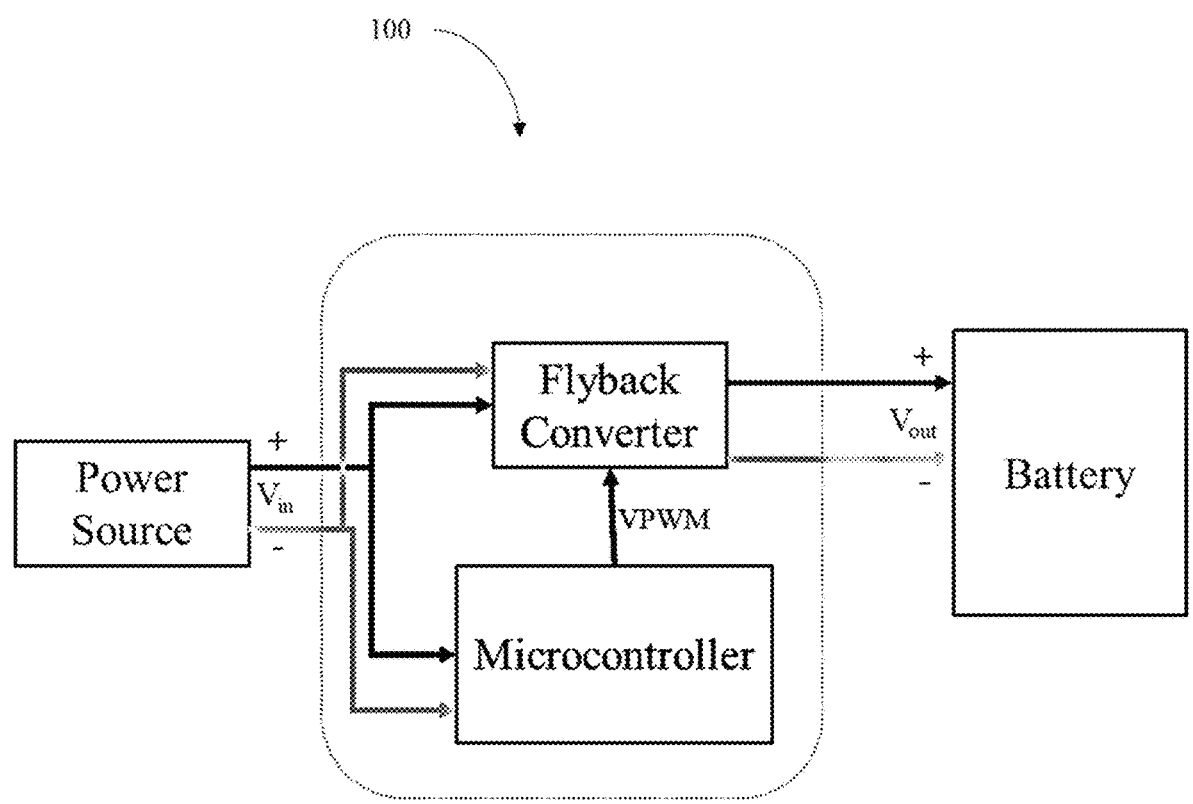
FIG. 1 is a block diagram for an example of an electrical network using a flyback converter.

Referring now to FIG. 1, an example of the electrical network 100 includes a power source. The power source generates a charge that powers the entire electrical network 100. In the example of the electrical network 100 of FIG. 1, the power source provides a charge to the flyback converter and the microcontroller. Generally, the power source may be any power source that generates enough charge to power the flyback converter, microcontroller, and the pulse width modulator integrated circuit. In other examples, the power source may be any power source that generates enough charge to power flyback converter and microcontroller. In yet another example, the power source may be any power source that generates enough charge to power flyback converter, the microcontroller, the pulse width modulator integrated circuit, a PID controller, and a sensor. In some examples, the power source produces a charge with a voltage ranging from about 0.1V to about 0.8V and a power ranging from about 0.3 mW to about 100 mW. Some examples of the power source include a microbial fuel cell, such as wastewater microbial fuel cells and benthic or sediment microbial fuel cells, or thermal electric generators.

Referring back to FIG. 1, the electrical network 100 includes a flyback converter. The flyback converter converts energy to useable or storable energy when the power source generates charge at low voltages and is off and set to an open circuit when the power source is not generating enough charge to power the electrical network 100. The flyback converter herein functions in discontinuous current mode to boost low input voltages to usable levels with high efficiency. The flyback converter may also operate in an open loop or a closed loop depending on the application. As shown in the electrical network 100 example in FIG. 1, the flyback converter harvests low voltage current produced by power source and converts the low voltage current into a higher voltage current to the battery.

Figure 2:
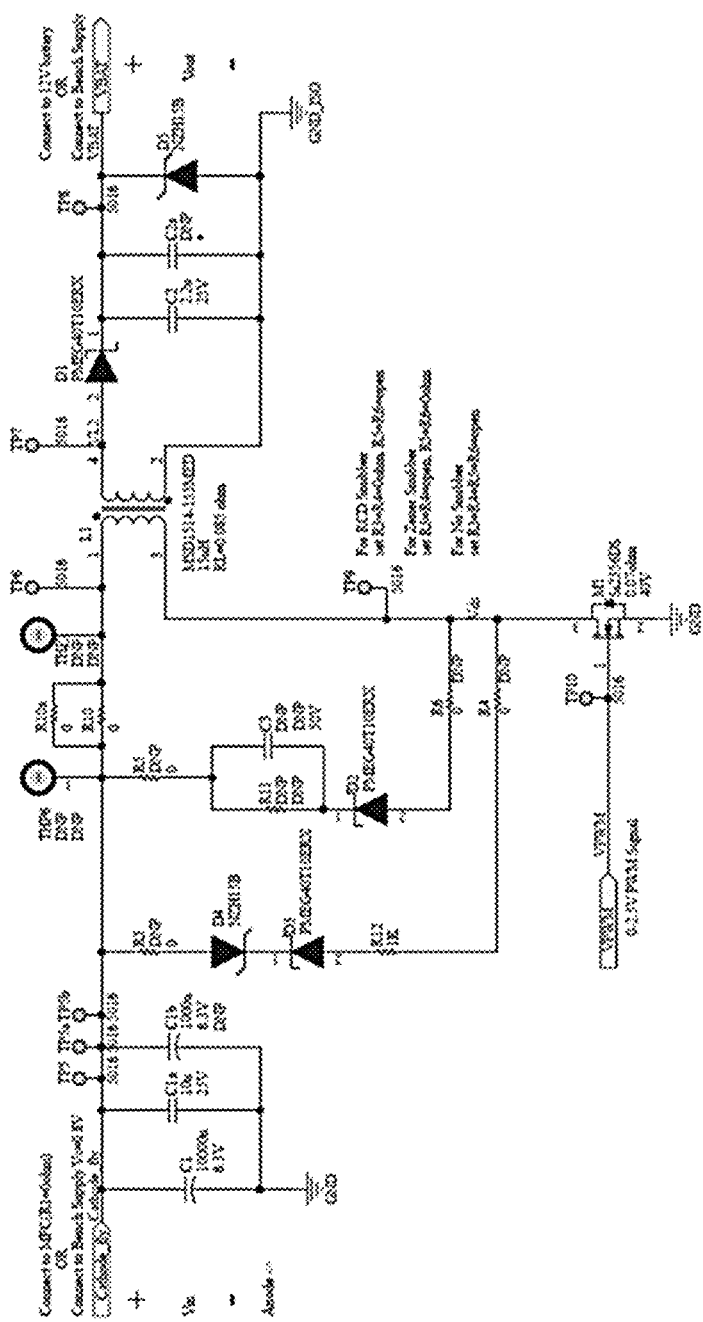
FIG. 2 is an example of the flyback converter circuit topology.

An example of the flyback converter topology is shown in FIG. 2. In this example, a battery is connected to the output of the secondary winding. Current pulses, whose sizes are dependent on the amount of power the power source (e.g., a microbial fuel cell) generates, is used to charge the battery. A 2.2 uF capacitor, C2, at the circuit output is placed to improve efficiency and power buffering capacity. A Zener diode clamps the output voltage to prevent over-voltage spikes from damaging the secondary-side circuit components.

In addition, in some examples, the flyback converter can have different levels of input impedance within an individual electrical network 100 by varying the duty cycle, the frequency of the pulse width modulator, or both. In other examples, the flyback converter has a fixed input impedance within an individual electrical network 100. This allows the electrical network 100 to adjust to the environment depending on how much charge the power source is generating at any given time. The flyback converter has an input impedance determined using a formula:

$$Zin = \frac{2*F*L}{D^2}$$

where F is a frequency of the pulse width modulator integrated circuit, D is the duty cycle of the pulse width modulator integrated circuit, L is a primary winding inductance of the pulse width modulator integrated circuit if a transformer has a 1:n winding where n≥1, and $Z_{in}$ is the input impedance.

Figure 3:
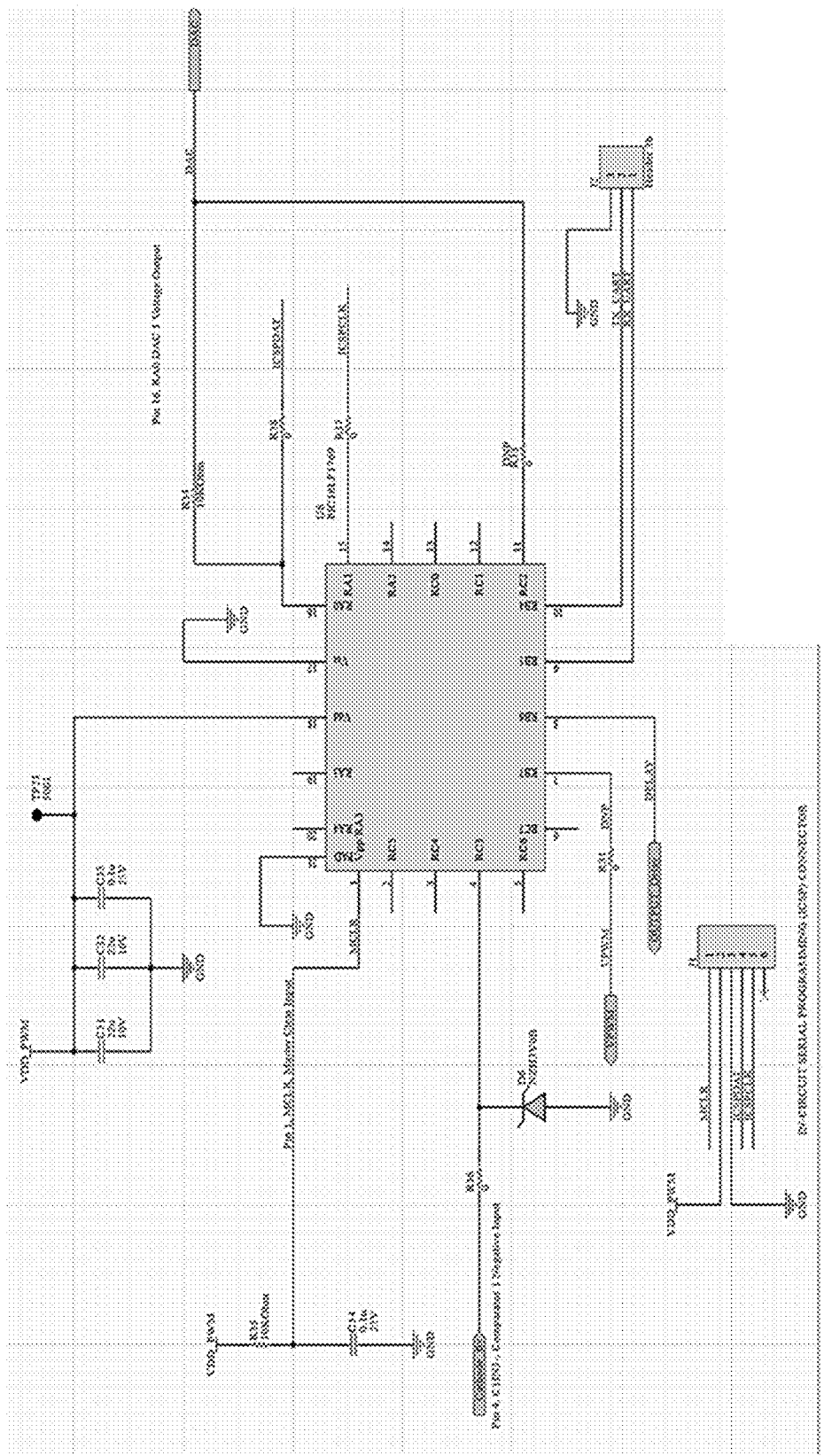
FIG. 3 is an example of the microcontroller circuit topology.

Referring back to FIG. 1, the electrical network 100 includes the microcontroller where the microcontroller monitors the power source voltage, calculates the voltage response, and outputs the control signal for the voltage. In some examples, the microcontroller feeds the pulse width modulator integrated circuit. The pulse width modulator integrated circuit generates the pulse width modulation signal that controls flyback switching parameters. FIG. 3 shows an example of the microcontroller circuit topology.

The microcontroller includes an analog-to-digital converter, a digital-to-analog converter, a comparator, or combinations thereof. The converter or comparator allows the microcontroller to hold the power source voltage at an optimum voltage set point. The microcontroller holds the power source voltage at an optimum voltage set point using a formula:

0.5*(PS open circuit voltage)

where the PS open circuit voltage is the power source open circuit voltage ranging from about 0.1V to about 0.8V. The microcontroller also includes a timer that is preset for the microcontroller to sleep. In one example, the timer is present for the microcontroller to sleep for a time ranging from about 1 second to about 72 hours depending on the application. For example, the timer is present for the microcontroller to sleep for a time ranging from about 1 second to about 12 hours. In another example, the timer is present for the microcontroller to sleep for a time ranging from about 30 minutes to about 1 hour. In yet another example, the microcontroller sleeps until receiving an external wakeup signal from a comparator when the power source voltage reaches a set point.

Figure 4:
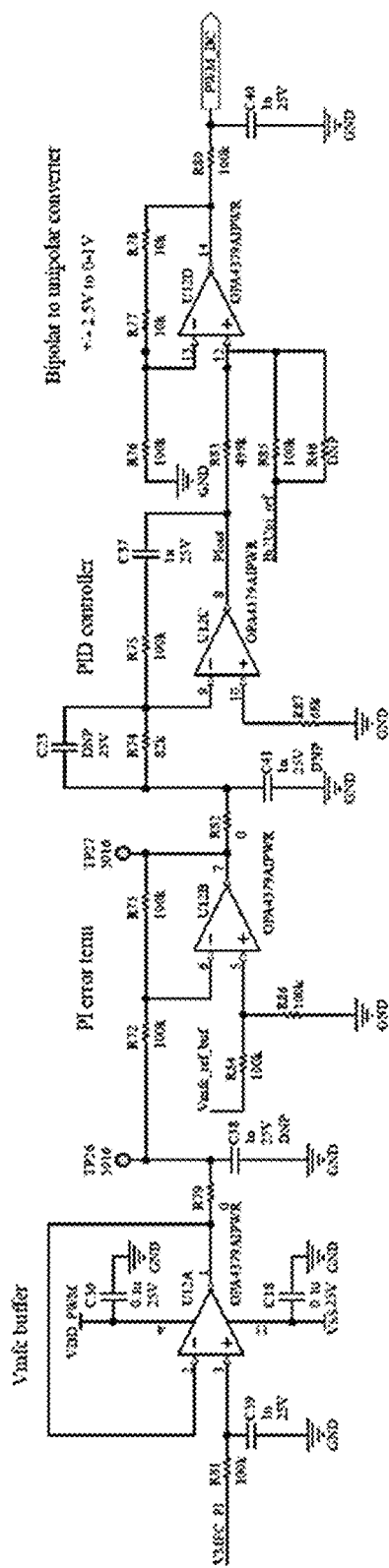
FIG. 4 is an example of the analog PID controller circuit topology.

The electrical network 100 may also include a PID controller (not shown in FIG. 1). The PID controller may be a digital PID controller, an analog PID controller, or a combination thereof. The PID controller may be attached to the microcontroller or is a discrete electronic component in the electrical network 100. In some examples, when an analog PID controller is used, the PID controller feeds the pulse width modulator integrated circuit rather than the microcontroller. The PID controller keeps the flyback converter input voltage at a predetermined set point. The predetermined set point depends on the application of the electrical network 100 and the circuit design. In some examples, the predetermined input voltage set point is about half the power source open circuit voltage. An example of the analog PID controller circuit topology is shown in FIG. 4. In FIG. 4, initially, the electrical network is set to 400 mV by tuning the potentiometer, R43, and measuring Vmfc_ref_buff. For a fixed set point option, the resistor, R42, can be populated and the resistor, R41, is left unpopulated R41. The resistors, R69 and R71, can be changed to achieve a specific set point.

Figure 5:
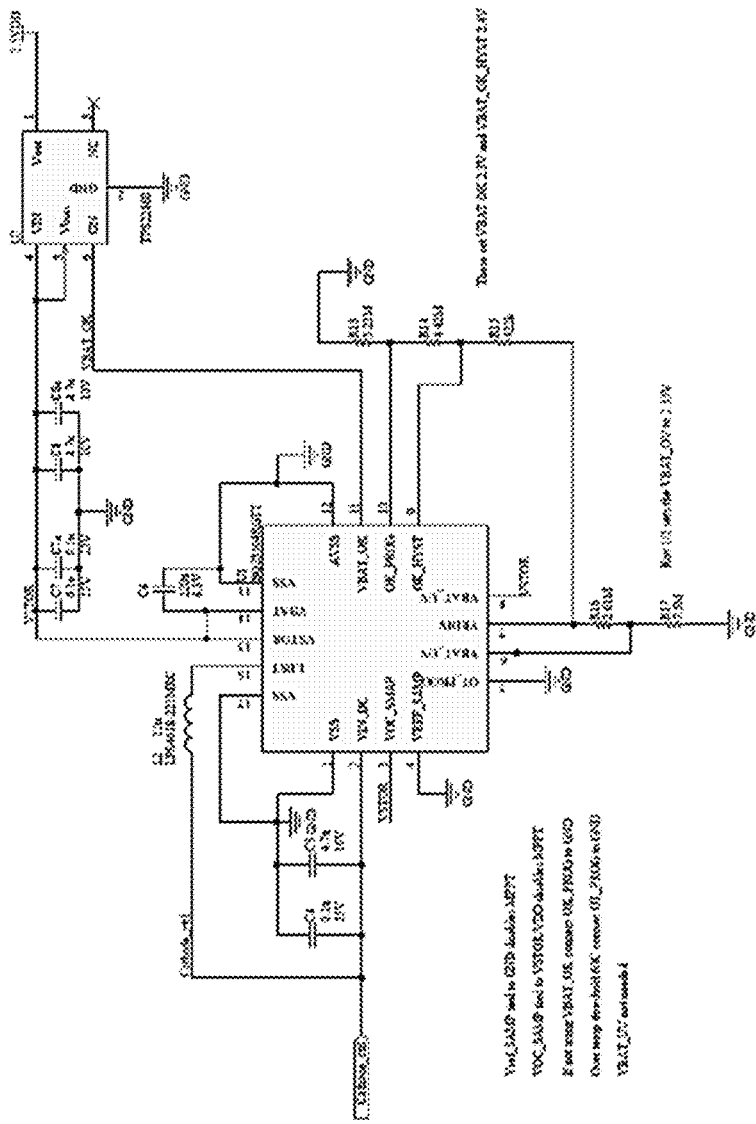
FIG. 5 is an example of the voltage boost converter topology.

Another component in the electrical network 100 includes a voltage boost converter (not shown in FIG. 1). The voltage boost converter utilizes the power source voltage and power to provide higher voltage power to the other electrical network components when needed. FIG. 5 shows an example of the circuit topology of the voltage boost converter. In this example, the microcontroller that controls the energy harvesting is powered by a positive 2.5V supply voltage. To obtain this supply voltage, an external ultra low voltage boost converter (BQ25504) boosts the power source (e.g., microbial fuel cell) input voltage to 2.5V. The microcontroller circuit has low start-up voltage of about 450 mV to about 500 mV, and once operating can run down to input voltages of about 50 mV. A load switch controlled by "VBAT_OK" voltage signal output of the BQ25504 IC turns power on and off to the control circuitry, which includes the microcontroller, pulse width modulator integrated circuit, and an external comparator. This allows downstream circuitry to start with a stable 2.5V and prevents a premature turn on.

Figure 6:
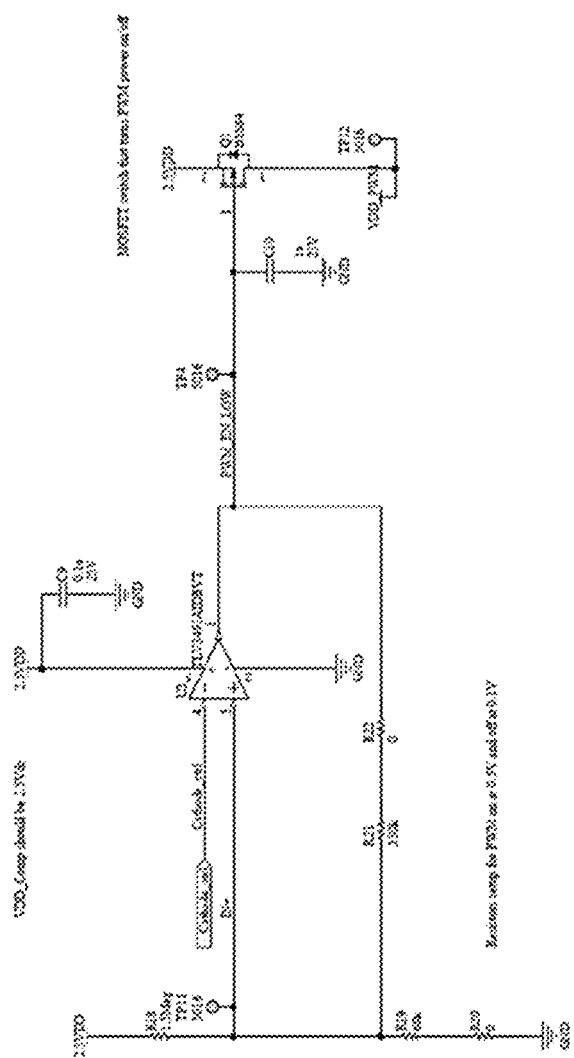
FIG. 6 is an example of comparator circuit topology for a load switch circuit.

A comparator may also be used as part of the microcontroller as previously stated herein (Not shown in FIG. 1). FIG. 6 shows an example of a comparator circuit topology. In this example, the energy harvesting circuitry turns on when the voltage of the power source, which in this example is a microbial fuel cell ($V_{mfc}$), reaches a user settable threshold, for example 500 mV. The energy harvesting circuitry may be turned off when $V_{mfc}$ falls below 100 mV. The comparator circuit is equipped with a p-type metal oxide semiconductor (PMOS) load switch (Q1). The PMOS transistor is used as a load switch to manage the on and off power delivery to the energy harvesting circuitry downstream.

The pulse width modulator integrated circuit sets a duty cycle and frequency for the flyback converter. In some examples, the pulse width modulator integrated circuit can also modify the frequency and duty cycle of the flyback converter while the electrical network 100 is in use. In an example, the pulse width modulator integrated circuit sets the duty cycle to a range of about 1% to about 99%. The pulse width modulator integrated circuit sets the frequency at a range of about 1 kHz to about 100 kHz.

Figure 7:
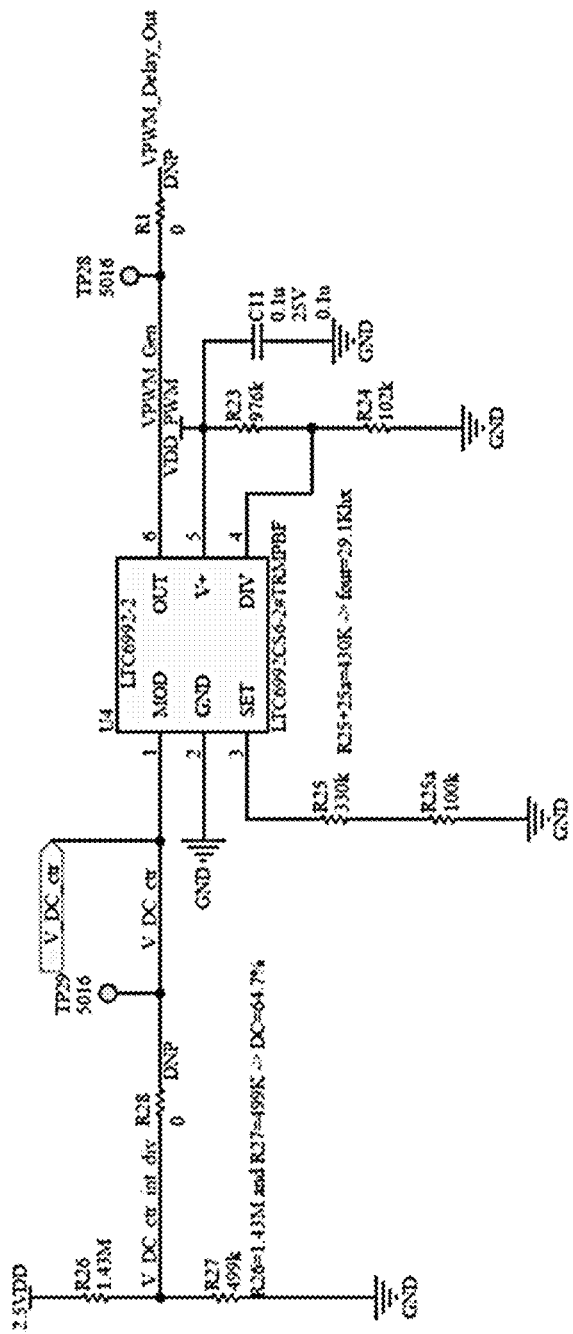
FIG. 7 is an example of the pulse width modulator integrated circuit topology.

FIG. 7 shows an example of the pulse width modulator integrated circuit topology. In this example, the resistors, R26 and R27, represent a voltage divider that can be utilized if a fixed PWM signal is preferred and allows the energy harvesting circuit to bypass PID control if a PID controller is being used. The jumper resistor R28 is not populated for that functionality, noted by a DNP (Do Not Populate) designation in FIG. 7.

Referring back to FIG. 1, the electrical network 100 further includes a battery. The battery stores charge produced by the power source (e.g., a microbial fuel cell) and boosted by the flyback converter. The charge may be used to power any component in the electrical network 100 when the power source is not producing enough charge. In addition, the battery can be used to power additional components in the electrical network 100 when the additional components are added to the electrical network 100, such as one or more sensors. The battery may be any Li-ion or lead acid battery capable of accepting about 3V to about 20V. Some examples of the battery include a 6V lead acid battery and a 12V lead acid battery.

In some examples, the electrical network 100 herein further includes a sensor. The sensor may vary depending on the application of the electrical network 100. The sensor or multiple sensors may be any sensor that is capable of being powered by power source or the battery. Some examples include a pH sensor, a temperature sensor, a motion sensor, an accelerometer, a compass, a pressure sensor, a magnetometer, and combinations thereof.

An electrical network system may be used herein. The electrical network system includes a power source, a flyback converter, a microcontroller, a PID controller, a voltage boost converter, a pulse width modulator integrated circuit, and a battery. The power source produces a charge with a voltage ranging from about 0.1V to about 0.8V and a power ranging from about 0.3 mW to about 100 mW. The flyback converter functions in discontinuous current mode. The microcontroller monitors the power source voltage, calculates a voltage response, and outputs a control signal for the voltage. The PID controller is a digital PID controller, an analog PID controller, or a combination thereof. The voltage boost converter utilizes the power source voltage and power to provide higher voltage power to the electrical network. The pulse width modulator integrated circuit sets a duty cycle and frequency for the flyback converter. The battery stores excess charge produced by the power source.

The electrical network system herein includes the same power source, flyback converter, microcontroller, PID controller, voltage boost converter, pulse width modulator integrated circuit, and battery as previously described herein. In addition, when a sensor is used in the system, the same sensor as previously described herein may be used.

To further illustrate the present disclosure, examples are given herein. These examples are provided for illustrative purposes and are not to be construed as limiting the scope of the present disclosure.

EXAMPLES

Example 1: Leakage Current Test

The leakage current test included a source meter connected to a printed circuit board (PCB). The PCB included a flyback converter, a microcontroller, and a pulse width modulator. The setup did not include a microbial fuel cell or a battery. The source meter provided the output voltage between 1V and 15V.

Figure 8:
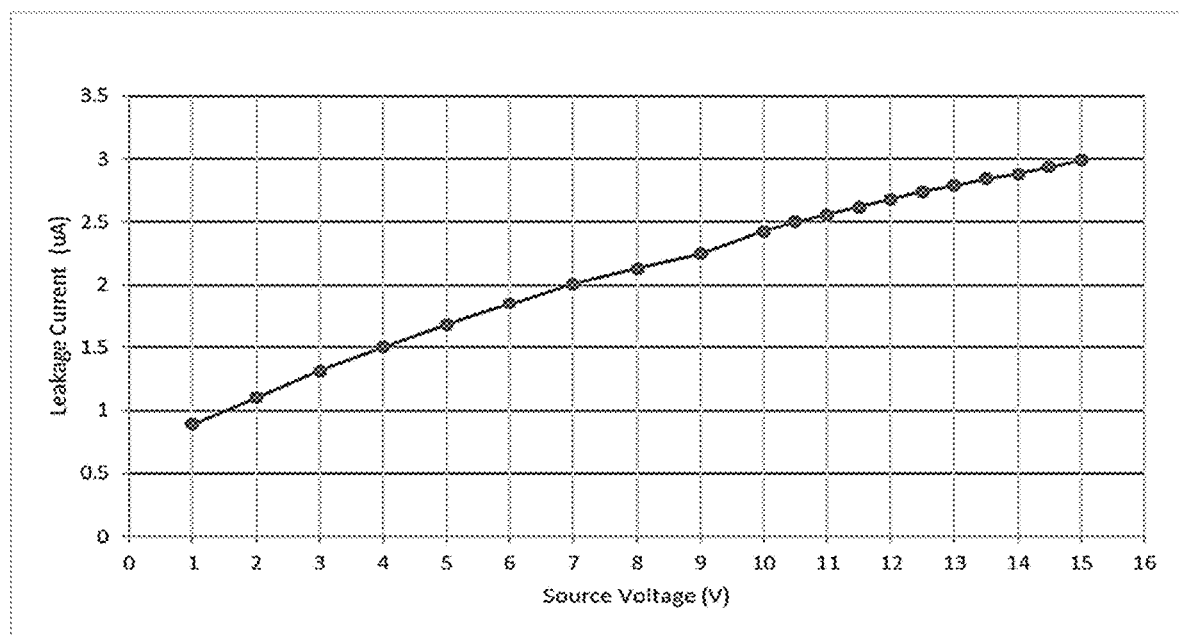
FIG. 8 is a plot of the Source Voltage (X-axis, labeled "Source Voltage (V)") vs. Leakage Current (Y-axis, labeled "Leakage Current (uA)")

The results of the test are shown in FIG. 8. The results show the leakage current is not significant on the output of PCB where the battery would connect. For example, if battery voltage is 12.5V, the leakage is 2.74 uA. The Zener diode starts to leak around 15.2V and reached the source meter current limit of 105 uA. The Zener diode has a working voltage 14.25V to 15.75V. Therefore, current leakage around 15.2V is in the expected range.

Example 2: Microbial Fuel Cell Circuit Board Power Draw Test

Figure 9:
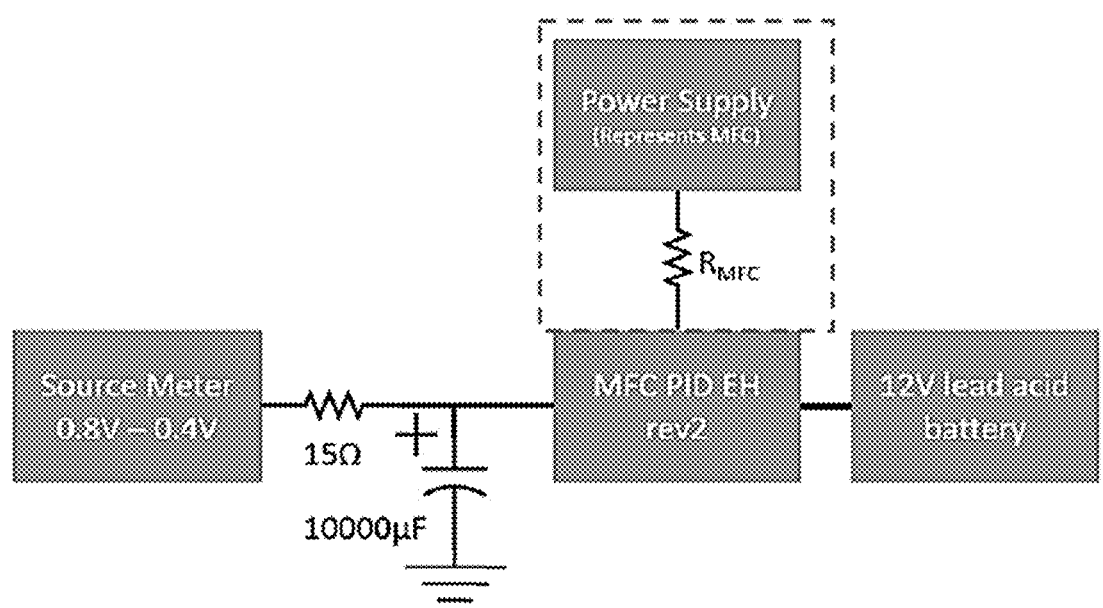
FIG. 9 is a block diagram of the experimental setup of the power draw test.

The power draw test setup is shown in FIG. 9. A separate power supply (Keithley 2400 source meter) was used to generate the input into the 2.5V boost circuit while another power supply (B&K Precision 9123A) was used to mimic a microbial fuel cell. A trace on the PCB was cut to make sure the source meter was the only supply connected to the boost circuit input. The "MFC PID EH rev2" refers to the whole energy harvesting circuit board, which includes the PID controller, the pulse width modulator integrated circuit, the comparator, and the flyback converter, used in this example. A series resistor of 15 ohms was used along with a 10,000 uF capacitor to insure that the source meter would see the same input as the microbial fuel cell if a real system was connected.

The source meter voltage was stepped to three different values (0.8V, 0.6V, and 0.4V) from an off state. All currents stated in Table 1 below are the steady state current and not measured during start-up. The MFC supply was "on" and set to 0.8V with series resistance 14 ohms. No noticeable power draw difference was observed when the microbial fuel cell resistance was changed to 24 ohms. With the microbial fuel cell supply "off," the source meter current measurement is taken as the max seen on the meter since the circuit is powered off except for the comparator that enables the remaining flyback converter circuit to power up. This causes the current to be more variable since the 2.5V boost integrated circuit is intermittently on to maintain the 2.5V rail. While the microbial fuel cell supply is "on," the current from the source meter was constant. A current probe connected to an oscilloscope was used to verify constant current at steady state.

With the microbial fuel cell supply "on," the power draw ranged from 0.98 mW to 1.22 mW for the different source meter voltages. With microbial fuel cell supply "off," only the 2.5V boost and comparator are powered. Under this condition, the max average power draw was 80 uW. The PID loop was set to hold the Vmfc at 0.4V. The average power draw was about 1.2 mW under these conditions. See the results in Table 1 below.

TABLE 1

Power Draw Test Results.

| Measurement # | Source Meter [V] | Source Meter [mA] | Voltage into 2.5 V Boost [V] | Power Board Draw [mW] | MFC Supply |
|---|---|---|---|---|---|
| 1 | 0.8 | 1.26 | 0.781 | 0.98 | On |
| 2 | 0.6 | 2.14 | 0.568 | 1.22 | On |
| 3 | 0.4 | 3.50 | 0.348 | 1.22 | On |
| 4 | 0.4 | 0.20 | 0.397 | 0.08 | Off |

Example 3: Microbial Fuel Cell Energy Harvest Test

Figure 10:
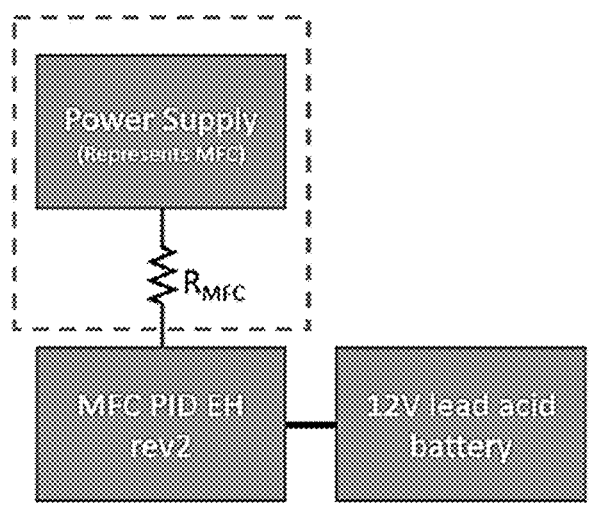
FIG. 10 is a block diagram of the experimental setup of the microbial fuel cell bench test.

The setup for energy harvesting measurement is shown in the block diagram depicted in FIG. 10. The power supply represents the microbial fuel cell open circuit voltage and the resistor (Rmfc) is the microbial fuel cell internal resistance. Rmfc is varied to change the power level into the board. This microbial fuel cell model supply powered the control circuits and was also the power source being harvested. A 12V lead-acid battery is used as a load to charge. An oscilloscope and current probe (Tektronix TBS2104 and TCP0030A, respectively) are used to measure PWM frequency, duty cycle, current flow to the battery, current flow from supply, and various board voltages. A resistor box is used for easy changes to Rmfc values.

The results are shown in Table 2 below. At lower Rmfc values ≤8 ohm (simulating higher power microbial fuel cells) the observed efficiencies are around 80%. For Rmfc>8 ohms, efficiency begins to drop as low as 56% (Rmfc=32 ohms, 2.6 mW delivered into the battery). Part of this efficiency drop is attributed to the logic circuit power overhead (i.e., the PID controller), as it starts to become comparable to the available power that can be delivered into battery.

TABLE 2

Rmfc Energy Harvesting Results.

| Rmfc [ohm] | Vmfc OC [V] | VPID Set [V] | $I_{in}$ [A] | $P_{in}$ [mW] | PWM Freq. [Hz] | $V_{bat}$ [V] | $I_{bat}$ ave [A] | $P_{bat}$ [mW] | Eff % |
|---|---|---|---|---|---|---|---|---|---|
| 1 | 0.8 | 0.4 | 234.0E−3 | 93.6 | 29000 | 11.62 | 6.5E−3 | 75.3 | 80 |
| 2 | 0.8 | 0.4 | 146.0E−3 | 58.4 | 29000 | 11.62 | 4.2E−3 | 48.4 | 83 |
| 4 | 0.8 | 0.4 | 82.6E−3 | 33.0 | 29000 | 11.62 | 2.2E−3 | 26.1 | 79 |
| 8 | 0.8 | 0.4 | 44.5E−3 | 17.8 | 29000 | 11.62 | 1.3E−3 | 14.6 | 82 |
| 16 | 0.8 | 0.4 | 22.1E−3 | 8.8 | 29000 | 11.62 | 546.1E−6 | 6.3 | 72 |
| 32 | 0.8 | 0.4 | 11.8E−3 | 4.7 | 29000 | 11.62 | 226.2E−6 | 2.6 | 56 |

The results show efficiency equal to or greater than 72% for the microbial fuel cell internal resistances at higher power levels. The PID loop is able to keep the microbial fuel cell voltage at a user controlled set point, which was 400 mV for these tests. When Rmfc>100 ohms with supply set to 0.8V and Vset point=400 mV, the microbial fuel cell internal resistance is too high to maintain energy harvesting power. This causes the circuit board to enter a cyclic on-off state that may drain more power than gained through energy harvesting due to increased power draw during start-up.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 1 kHz to about 100 kHz should be interpreted to include not only the explicitly recited limits of from about 1 kHz to about 100 kHz, but also to include individual values, such as 13 kHz, 50 kHz, 75 kHz, etc., and sub-ranges, such as from about 50 kHz to about 75 kHz, etc.

In describing and claiming the examples disclosed herein, the singular forms "a", "an", and "the" include plural referents unless the context clearly dictates otherwise.

What is claimed is:

1. An electrical network, comprising:
   a power source, wherein the power source produces a charge with a power source voltage ranging from 0.1V to 0.8V and a power ranging from 0.3 mW to 100 mW;
   a flyback converter, wherein the flyback converter functions in discontinuous current mode;
   a microcontroller, wherein the microcontroller monitors the power source voltage, calculates a voltage response, and outputs a control signal for the power source voltage and holds the power source voltage at an optimum voltage set point using a formula:

$$0.5*(PS \text{ open circuit voltage})$$

where PS open circuit voltage is the power source open circuit voltage ranging from 0.1V to 0.8V;
   a PID controller, wherein the PID controller is a digital PID controller, an analog PID controller, or a combination thereof;
   a voltage boost converter, wherein the voltage boost converter utilizes the power source voltage and power to provide higher voltage power to the electrical network;
   a pulse width modulator integrated circuit, wherein the pulse width modulator integrated circuit sets a duty cycle and frequency for the flyback converter; and
   a battery, wherein the battery stores excess charge produced by the power source.

2. The electrical network of claim 1, wherein the flyback converter operates in an open loop or a closed loop.

3. The electrical network of claim 1, wherein the flyback converter harvests the excess charge produced by a microbial fuel cell and diverts the excess charge to the battery.

4. The electrical network of claim 1, wherein pulse width modulator integrated circuit sets the duty cycle to a range of 1% to 99%.

5. The electrical network of claim 1, further including a sensor, wherein the sensor is powered by the battery.

6. The electrical network of claim 5, wherein the sensor is selected from the group consisting of a pH sensor, a temperature sensor, a motion sensor, an accelerometer, a compass, a pressure sensor, a magnetometer, and combinations thereof.

7. The electrical network of claim 1, wherein the flyback converter has an input impedance determined using a formula:

$$Zin = \frac{2*F*L}{D^2}$$

where F is a frequency of the pulse width modulator integrated circuit, D is the duty cycle of the pulse width modulator integrated circuit, L is a primary winding inductance of the pulse width modulator integrated circuit if a transformer has a 1:1 winding, and $Z_{in}$ is the input impedance.

8. The electrical network of claim 1, wherein a timer is set for the microcontroller to sleep for a time ranging from 6 hours to 12 hours.

9. The electrical network of claim 1, wherein the PID controller is attached to the microcontroller or is a discrete electronic component in the electrical network.

10. The electrical network of claim 1, the pulse width modulator integrated circuit sets the frequency at a range of 1 kHz to 100 kHz.

11. The electrical network of claim 1, wherein the microcontroller includes an analog-to-digital converter, a digital-to-analog converter, a comparator, and combinations thereof.

12. An electronic network system, comprising:
   a power source, wherein the power source produces a charge with a power source voltage ranging from 0.1V to 0.8V and a power ranging from 0.3 mW to 100 mW;
   a flyback converter, wherein the flyback converter functions in discontinuous current mode;
   a microcontroller, wherein the microcontroller monitors the power source voltage, calculates a voltage response, and outputs a control signal for the power source voltage and holds the power source voltage at an optimum voltage set point using a formula:

0.5*(PS open circuit voltage)

where PS open circuit voltage is the power source open circuit voltage ranging from 0.1V to 0.8V;
   a PID controller, wherein the PID controller is a digital PID controller, an analog PID controller, or a combination thereof;
   a voltage boost converter, wherein the voltage boost converter utilizes the power source voltage and power to provide higher voltage power to the electrical network;
   a pulse width modulator integrated circuit, wherein the pulse width modulator integrated circuit sets a duty cycle and frequency for the flyback converter; and
   a battery, wherein the battery stores excess charge produced by the power source.

13. The electrical network of claim 12, wherein the flyback converter operates in an open loop or a closed loop.

14. The electrical network of claim 12, wherein the flyback converter harvests the excess charge produced by a microbial fuel cell and diverts the excess charge to the battery.

15. The electrical network of claim 12, wherein pulse width modulator integrated circuit sets the duty cycle to a range of 1% to 99%.

16. The system of claim 12, further including further including a sensor selected from the group consisting of a pH sensor, a temperature sensor, a motion sensors, an accelerometer, a compass, a pressure sensor, a magnetometer, and combinations thereof.

17. The system of claim 12, wherein the flyback converter has an input impedance determined using a formula:

$$Zin = \frac{2*F*L}{D^2}$$

where F is a frequency of the pulse width modulator integrated circuit, D is the duty cycle of the pulse width modulator integrated circuit, L is a primary winding inductance of the pulse width modulator integrated circuit if a transformer has a 1:1 winding, and $Z_{in}$ is the input impedance.

18. The system of claim 12, wherein the microcontroller includes an analog-to-digital converter, a digital-to-analog converter, a comparator, or a combination thereof.

* * * * *